United States Patent
Deshpande et al.

(10) Patent No.: US 11,368,447 B2
(45) Date of Patent: *Jun. 21, 2022

(54) OAUTH2 SAML TOKEN SERVICE

(71) Applicant: SAP SE, Walldorf (DE)

(72) Inventors: Deepak Govardhanrao Deshpande, Bengaluru (IN); Gopalkrishna Kulkarni, Bangalore (IN)

(73) Assignee: SAP SE, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/885,555

(22) Filed: May 28, 2020

(65) Prior Publication Data

US 2020/0296085 A1  Sep. 17, 2020

Related U.S. Application Data

(63) Continuation of application No. 16/108,400, filed on Aug. 22, 2018, now Pat. No. 10,742,636.

(51) Int. Cl.
*H04L 29/06* (2006.01)
*G06F 21/33* (2013.01)
(Continued)

(52) U.S. Cl.
CPC ........ *H04L 63/0815* (2013.01); *G06F 21/335* (2013.01); *G06F 21/41* (2013.01);
(Continued)

(58) Field of Classification Search
CPC . H04L 63/0815; H04L 63/0807; H04L 67/20; H04L 67/10; G06F 21/335; G06F 21/41
See application file for complete search history.

(56) References Cited

U.S. PATENT DOCUMENTS 8,145,793 B1 ‡ 3/2012 Belanger ................ H04L 67/10
709/230
9,544,311 B2 ‡ 1/2017 Raepple .............. H04L 63/0884
(Continued)

FOREIGN PATENT DOCUMENTS

| CN | 104255007 | 12/2014 |
| CN | 104601594 | 5/2015 |
| GB | 2489563 | ‡ 10/2012 |

OTHER PUBLICATIONS

U.S. Appl. No. 15/996,824, filed Oct. 28, 1856, F42B5/26, 102/46.‡
(Continued)

*Primary Examiner* — Viral S Lakhia
(74) *Attorney, Agent, or Firm* — Fish & Richardson P.C.

(57) ABSTRACT

The present disclosure involves systems, software, and computer implemented methods for principal propagation. One example method includes deploying a token service to a first cloud platform. A first token request is received from an integration component for a token to be included in a message sent from the first cloud platform to a second cloud platform. A user information request is generated and sent to an identity provider associated with the first cloud platform. User information is received from the identity provider in response to the user information request. A second token request is generated and sent to a token service provider associated with the second cloud platform. The second token request includes the received user information. The requested token is received from the token service provider. The received token is sent to the integration component to enable the integration component to send the message to the second cloud platform.

6 Claims, 5 Drawing Sheets

(51) Int. Cl.
*G06F 21/41* (2013.01)
*H04L 67/53* (2022.01)
*H04L 67/10* (2022.01)

(52) U.S. Cl.
CPC ........ *H04L 63/0807* (2013.01); *H04L 63/102* (2013.01); *H04L 67/20* (2013.01); *H04L 67/10* (2013.01)

(56) References Cited

U.S. PATENT DOCUMENTS

| | | | | |
|---|---|---|---|---|
| 9,648,043 | B2 ‡ | 5/2017 | Handa | G06F 16/957 |
| 9,665,654 | B2 * | 5/2017 | Duncker | H04L 63/102 |
| 9,769,142 | B2 * | 9/2017 | Zhang | H04L 9/3268 |
| 9,805,185 | B2 * | 10/2017 | Ravi | H04L 63/10 |
| 9,948,631 | B2 * | 4/2018 | Flamini | H04L 63/04 |
| 10,135,803 | B2 * | 11/2018 | Kavantzas | H04L 63/08 |
| 10,157,421 | B2 * | 12/2018 | Sheng | G06Q 40/06 |
| 10,218,690 | B2 ‡ | 2/2019 | Helsen | H04L 63/08 |
| 10,270,743 | B2 * | 4/2019 | Eberlein | G06F 21/6227 |
| 10,505,733 | B2 ‡ | 12/2019 | Rowe | H04L 9/3213 |
| 10,673,839 | B2 * | 6/2020 | Zhang | H04L 9/3213 |
| 10,757,091 | B2 * | 8/2020 | Kannan | H04L 63/0823 |
| 11,030,618 | B1 * | 6/2021 | Budko | G06Q 20/3829 |
| 2010/0100924 | A1 ‡ | 4/2010 | Hinton | G06F 21/10 726/1 |
| 2011/0270751 | A1 | 11/2011 | Csinger et al. | |
| 2012/0265976 | A1 ‡ | 10/2012 | Spiers | G06F 9/45533 713/2 |
| 2015/0244705 | A1 * | 8/2015 | Flamini | H04L 29/08702 726/8 |
| 2016/0036790 | A1 ‡ | 2/2016 | Shastry | H04L 63/0876 713/168 |
| 2016/0219060 | A1 ‡ | 7/2016 | Karunakaran | H04L 63/0815 |
| 2016/0323249 | A1 * | 11/2016 | Duncker | G06F 16/26 |
| 2017/0142085 | A1 * | 5/2017 | Zhang | H04W 12/069 |
| 2018/0115542 | A1 ‡ | 4/2018 | Dungen | H04L 63/0823 |
| 2018/0302405 | A1 ‡ | 10/2018 | Gordon | H04L 63/0884 |
| 2019/0058706 | A1 ‡ | 2/2019 | Feijoo | G06F 21/335 |
| 2019/0097802 | A1 ‡ | 3/2019 | Rowe | H04L 9/3213 |
| 2019/0213104 | A1 ‡ | 7/2019 | Qadri | G06F 21/12 |
| 2019/0379663 | A1 ‡ | 12/2019 | Odenheimer | H04L 63/029 |
| 2020/0067905 | A1 | 2/2020 | Deshpande et al. | |
| 2020/0153870 | A1 * | 5/2020 | Roche | G06F 21/52 |
| 2020/0169549 | A1 * | 5/2020 | Smith | H04W 12/06 |

OTHER PUBLICATIONS

U.S. Appl. No. 16/014,453, filed Nov. 4, 1856, A01K97/14, 294/19.‡
U.S. Appl. No. 15/962,138, filed Oct. 28, 1856, E05B67/36, 70/32.‡
Extended European Search Report issued in European Application No. 18208003.6 dated Jun. 5, 2019, 5 pages.‡
Authentication Header Provider (SAP Cloud Platform SDK for Neo Environment); https://help.hana.ondemand.comljavadoc/comlsap/core/connectivity/api/authentication/Authenticatio nHeaderProvider.html [retrieved Aug. 22, 2018].‡
U.S. Appl. No. 15/962,138, filed Apr. 25, 2018, Kulkarni.
U.S. Appl. No. 15/996,824, filed Jun. 4, 2018, Kulkarni.
U.S. Appl. No. 16/014,453, filed Jun. 21, 2018, Kulkarni.
Authentication Header Provider (SAP Cloud Platform SDK for Neo Environment); https://help.hana.ondemand.com/javadoc/com/sap/core/connectivity/api/authentication/AuthenticationHeaderProvider.html [retrieved Aug. 22, 2018], 3 pages.
Office Action issued in Chinese Application No. 201811451821.1 dated Jul. 6, 2021, 13 pages (With English Translation).

\* cited by examiner
‡ imported from a related application

OAUTH2 SAML TOKEN SERVICE

CLAIM OF PRIORITY

This application claims priority under 35 USC § 120 to U.S. patent application Ser. No. 16/108,400, filed on Aug. 22, 2018, the entire contents of which are hereby incorporated by reference.

TECHNICAL FIELD

The present disclosure relates to computer-implemented methods, software, and systems for principal propagation.

BACKGROUND

With Single Sign On (SSO), a user can log in using a single identifier and password to gain access to multiple systems without having to use multiple user names and passwords for the multiple systems. Principal propagation is a process by which a sending system forwards user context information unchanged to a receiving system. SAML (Security Assertion Markup Language) is an open standard for exchanging authentication and authorization data between parties. OAuth2 (Open Authentication Version 2) is an open standard for access delegation.

SUMMARY

The present disclosure involves systems, software, and computer implemented methods for principal propagation. One example method includes deploying a token service to a first cloud platform. A first token request is received from an integration component for a token to be included in a message sent from the first cloud platform to a second cloud platform. A user information request is generated and sent to an identity provider associated with the first cloud platform. User information is received from the identity provider in response to the user information request. A second token request is generated and sent to a token service provider associated with the second cloud platform. The second token request includes the received user information. The requested token is received from the token service provider. The received token is sent to the integration component to enable the integration component to send the message to the second cloud platform.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

An integration scenario can model integration and connectivity between two computing systems. Different computing systems can communicate, for example, in business to business (B2B) communication, electronic data interchange (EDI), or some other type of system-to-system or server-to-server communication. An integration scenario can include a user using an application offered by a first system. The first system may invoke a service provided by another system. User information can be propagated from the first system to the second system, so that the service can be performed in the second system on behalf of the user.

An OAuth2 SAML token service can be used in the first system to interface with native APIs (Application Programming Interfaces) of the first system, for retrieving user information from the first system for use in generating a token to be passed to the second system. The OAuth2 SAML token service can shield the application and integration components from details about how to retrieve user information in particular systems and how to have a token generated. The OAuth2 SAML token service can encapsulate user information retrieval and token request details—i.e., the application and integration components can, instead of needing to know such details, simply request a token and pass a received token to the second system. Although a two system scenario is described, the OAuth2 SAML token service can be used to provide multiple tokens, for multiple target systems, if the application invokes multiple services provided by multiple external systems.

The OAuth2 SAML token service can be a re-usable, pluggable component that can be deployed to a variety of types of cloud systems, to expose various native APIs of respective cloud systems to integration components. The integration components can use a consistent, common interface provided by the OAuth2 SAML token service, rather than having to know details of various native API differences which may be found among various types of cloud systems. The OAuth2 SAML token service can be configured to interface with the various types of native APIs provided by the various cloud systems.

The OAuth2 SAML token service can be extended in the future, to interface with new cloud systems which may provide new, different native APIs. Interfaces to the new, different native APIs can be encapsulated within the OAuth2 SAML token service, and integration components can use a same, consistent interface provided by the OAuth2 SAML token service as used for prior cloud systems, without needing to be changed, to get access to the new native APIs of the new cloud systems. Encapsulating native API details within the OAuth2 SAML token service can enable integration scenarios to scale more easily to other and new platforms, since integration components other than the token service do not need to know native API details.

Figure 1:
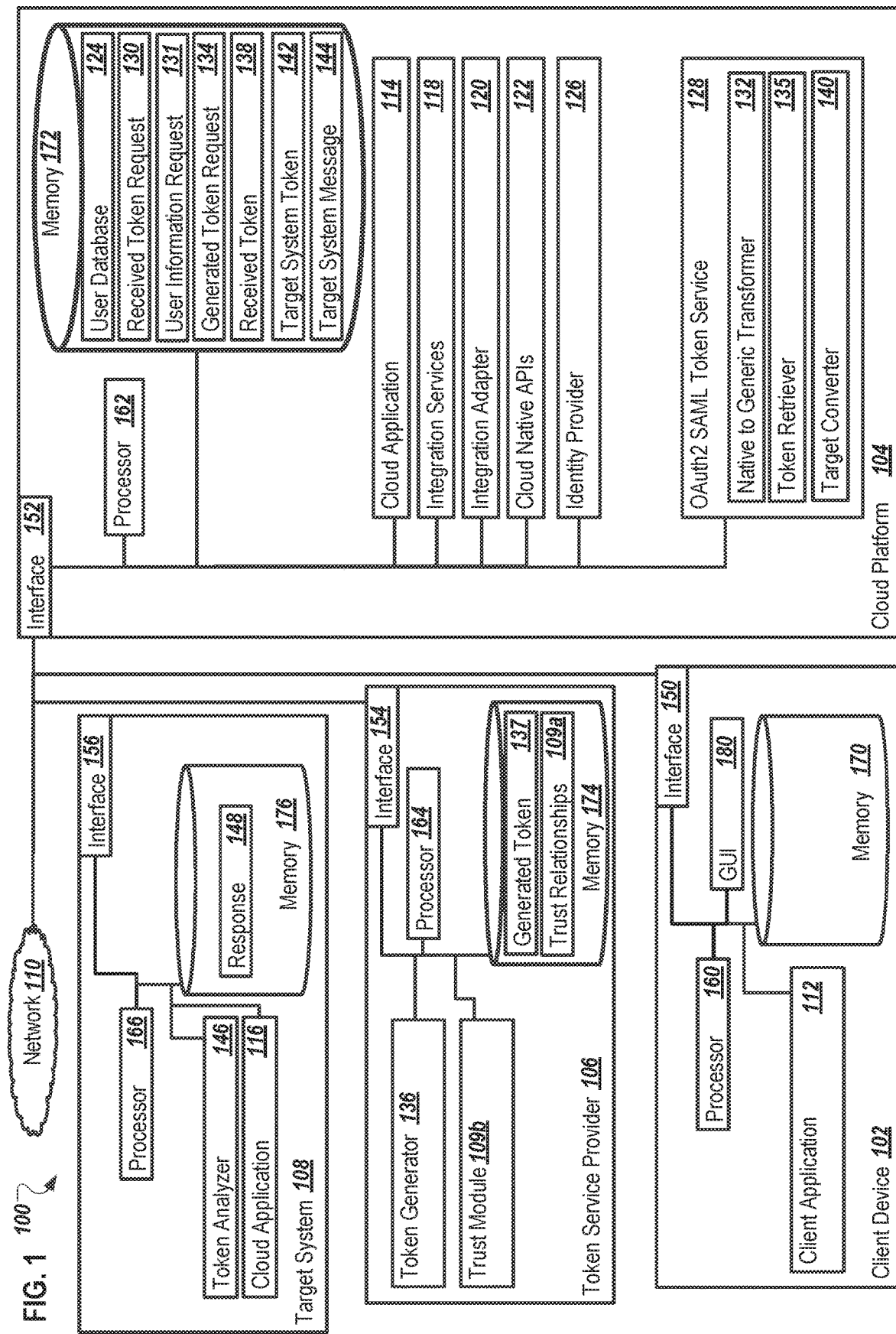
FIG. 1 is a block diagram illustrating an example system for principal propagation.

FIG. 1 is a block diagram illustrating an example system 100 for principal propagation. Specifically, the illustrated environment 100 includes or is communicably coupled with a client 102, a cloud platform 104, a token service provider 106, a target system 108, and a network 110. Trust relationships can be established between the cloud platform 104, the token service provider 106, and the target system 108. Trust relationships 109a can be generated (e.g., by a trust module 109b) and stored at the token service provider 106 (and/or at other points within the system 100).

A client application 112 running on the client 102 can invoke a cloud application 114 provided by the cloud platform 104. The cloud application 114 can be part of an integration scenario in that the cloud application 114 can be configured to integrate with an external cloud application 116 provided by the target system 108. The cloud application 114 can be configured to invoke an integration services component 118 to interface with the target system 108. The integration services component 118 can provide an integration adapter 120 that is configured to communicate with the target system 108.

The target system 108 can require that requests for the external cloud application 116 include authentication credentials, such as a token. The cloud platform 104 can provide cloud native APIs 122 for applications to request user information, which can be used in token creation. User information can be stored in a user database 124 and managed by an identity provider 126 that is included in or otherwise associated with the cloud platform 104.

Rather than require the integration adapter 120 to know both details about communicating with the target system 108 and details about user information retrieval and token creation within the cloud platform 104, the integration adapter 120 can be configured to request a token from a token service 128 (e.g., an OAuth2 SAML token service). Decoupling the integration adapter 120 from native user information retrieval and token creation can enable the integration adapter 120 to be deployed, unchanged, to cloud platforms other than the cloud platform 104. The token service 128 can encapsulate details specific to particular cloud systems.

The token service 128 can receive a received token request 130 from the integration adapter 120. The received token request 130 can include, for example, a URL (Uniform Resource Locator) of the token service provider 106 and/or a client identifier associated with the target system 108. The token service 128 can invoke the cloud native APIs 122 (e.g., as a user information request 131) to request and receive user information about a currently-logged in user. A native to generic transformer 132 of the token service 128 can include user information received from the cloud native APIs in a generated token request 134.

The generated token request 134 can be sent by a token retriever 135 to the token service provider 106 (e.g., using the URL of the token service provider 106). A token generator 136 can generate a token 137 in response to receiving the generated token request 134, and provide the generated token 137 to the token retriever 135 as a received token 138. A target converter 140 can format the received token 138 into a target system token 142 that is in a format acceptable and processable by the integration adapter 120 and the target system 108.

The target converter 140 can provide the target system token 142 to the integration adapter 120. The integration adapter 120 can include the target system token 142 in a target system message 144. The target system message 144 that includes the target system token 142 can be sent to the target system 108, for processing by the external cloud application 116. A token analyzer 146 in the target system 108 can verify the target system token 142. The external cloud application 116 can process the target system message 144 and generate a response 148. The response 148 can be sent to the integration adapter 120 and passed on to the cloud application 114, using the integration services component 118.

As used in the present disclosure, the term "computer" is intended to encompass any suitable processing device. For example, although FIG. 1 illustrates a single cloud platform 104, a single client 102, a single target system 108, and a single token service provider 106, the system 100 can be implemented using two or more cloud platforms 104, two or more clients 102, two or more target systems 108, and two or more token service providers 106. Indeed, the cloud platform 104, the client 102, the target system 108, and the token service provider 106 may be or include any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the client 102, cloud platform 104, the target system 108, and the token service provider 106 may be adapted to execute any operating system, including Linux, UNIX, Windows, Mac OS®, Java™, Android™, iOS or any other suitable operating system. According to one implementation, the cloud platform 104 may also include or be communicably coupled with an e-mail server, a Web server, a caching server, a streaming data server, and/or other suitable server.

Interfaces 150, 152, 154, and 156 are used by the client 102, cloud platform 104, the token service provider 106, and the target system 108, respectively, for communicating with other systems in a distributed environment—including within the system 100—connected to the network 110. Generally, the interfaces 150, 152, 154, and 156 each comprise logic encoded in software and/or hardware in a suitable combination and operable to communicate with the network 110. More specifically, the interfaces 150, 152, 154, and 156 may each comprise software supporting one or more communication protocols associated with communications such that the network 110 or interface's hardware is operable to communicate physical signals within and outside of the illustrated system 100.

The client 102, the cloud platform 104, the token service provider 106, and the target system 108 each respectively include processor(s) 160, 162, 164, or 166. Each of the processor(s) 160, 162, 164, or 166 may be or include a central processing unit (CPU), a blade, an application specific integrated circuit (ASIC), a field-programmable gate array (FPGA), or another suitable component. Generally, each of the processor(s) 160, 162, 164, or 166 executes instructions and manipulates data to perform the operations of a respective computing device.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The client 102, the cloud platform 104, the token service provider 106, and the target system 108 each respectively include memory 170, 172, 174, or 176. In some implementations, one or more described computing devices include multiple memories. Each of the memories 170, 172, 174, and 176 may include any type of memory or database module and may take the form of volatile and/or non-volatile memory including, without limitation, magnetic media, optical media, random access memory (RAM), read-only memory (ROM), removable media, or any other suitable local or remote memory component. Each of the memories 170, 172, 174, and 176 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the system 100.

The client 102 may generally be any computing device operable to connect to or communicate with the cloud platform 104 via the network 110 using a wireline or wireless connection. In general, the client 102 comprises an electronic computer device operable to receive, transmit, process, and store any appropriate data associated with the system 100 of FIG. 1. The client 102 can include one or more client applications, including the client application 112. A client application is any type of application that allows the client 102 to request and view content on the client 102. In some implementations, a client application can use parameters, metadata, and other information received at launch to access a particular set of data from the cloud platform 104. In some instances, a client application may be an agent or client-side version of the one or more enterprise applications running on an enterprise server (not shown). The processor(s) 160 included in the client 102 each execute the functionality required to send requests to the cloud platform 104 and to receive and process responses from the cloud platform 104.

The client 102 is generally intended to encompass any client computing device such as a laptop/notebook computer, wireless data port, smart phone, personal data assistant (PDA), tablet computing device, one or more processors within these devices, or any other suitable processing device. For example, the client 102 may comprise a computer that includes an input device, such as a keypad, touch screen, or other device that can accept user information, and an output device that conveys information associated with the operation of cloud platform 104, or the client 102 itself, including digital data, visual information, or a GUI (Graphical User Interface) 180.

The GUI 180 of the client 102 interfaces with at least a portion of the system 100 for any suitable purpose, including generating a visual representation of the client application 112. In particular, the GUI 180 may be used to view and navigate various Web pages. Generally, the GUI 180 provides the user with an efficient and user-friendly presentation of business data provided by or communicated within the system 100. The GUI 180 may comprise a plurality of customizable frames or views having interactive fields, pull-down lists, and buttons operated by the user. The GUI 180 contemplates any suitable graphical user interface, such as a combination of a generic web browser, intelligent engine, and command line interface (CLI) that processes information and efficiently presents the results to the user visually.

There may be any number of client devices 102 associated with, or external to, the system 100. For example, while the illustrated system 100 includes one client 102, alternative implementations of the system 100 may include multiple clients 102 communicably coupled to the cloud platform 104 and/or the network 110, or any other number suitable to the purposes of the system 100. Additionally, there may also be one or more additional client devices 102 external to the illustrated portion of system 100 that are capable of interacting with the system 100 via the network 110. Further, the term "client", "client device" and "user" may be used interchangeably as appropriate without departing from the scope of this disclosure. Moreover, while the client 102 is described in terms of being used by a single user, this disclosure contemplates that many users may use one computer, or that one user may use multiple computers.

Figure 2:
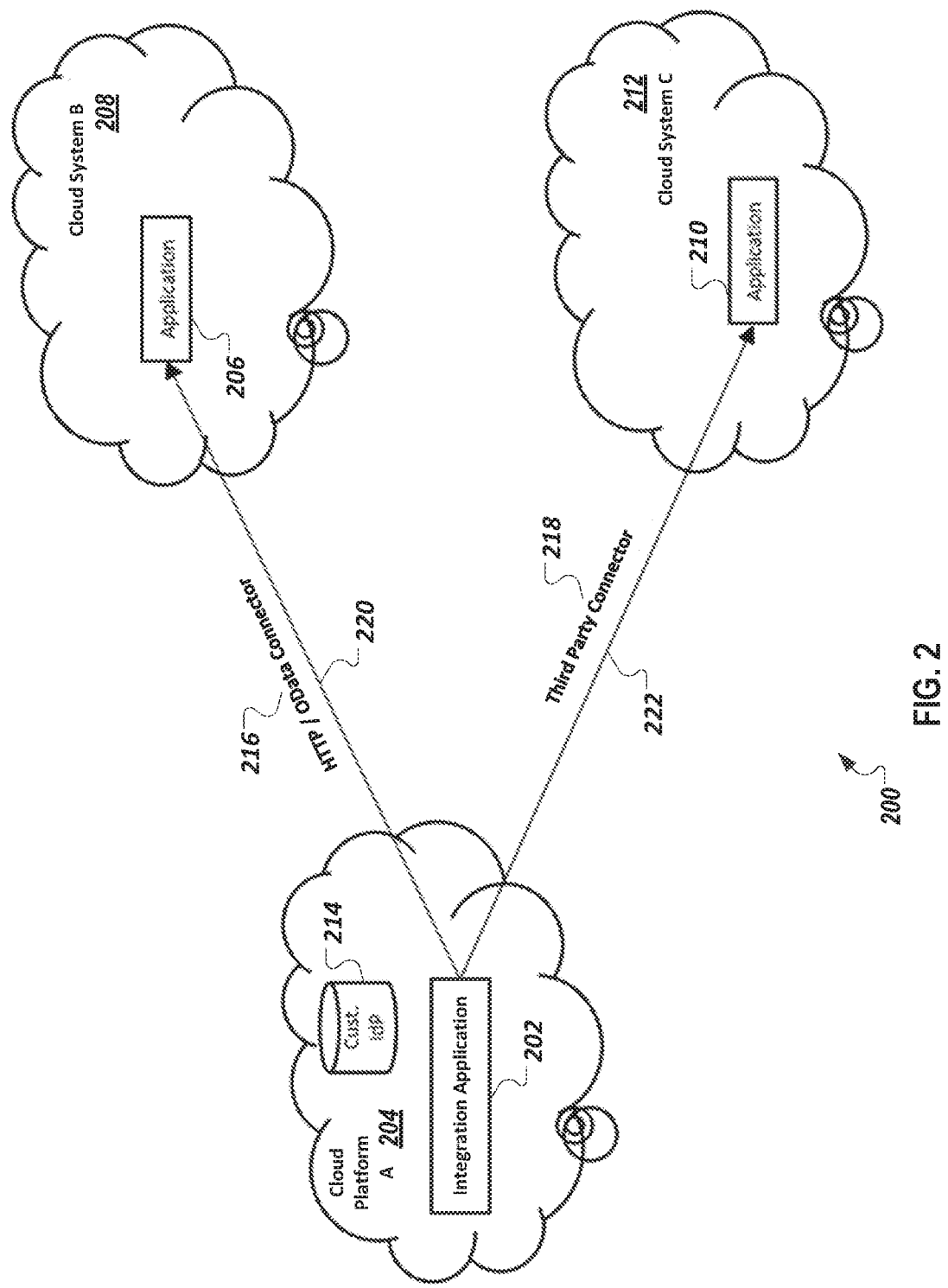
FIG. 2 illustrates a system in which principal propagation occurs between various cloud systems.

FIG. 2 illustrates a system 200 in which principal propagation occurs between various cloud systems. A user is using an integration application 202 provided by a cloud platform 204. The integration application 202 is configured to invoke an application 206 provided by a first cloud system 208 and an application 210 provided by a second cloud system 212. For example, the integration application 202 may be a sales order approval application. The application 206 can be an application to retrieve sales order information stored in the first cloud system 208. The application 210 can be an application to retrieve vendor information from the second cloud system 212. The integration application 202 can be configured to present sales order and vendor information to the user and enable the user to approve or reject particular sales orders, for example.

The user can provide login information when using the integration application 212. The integration application 202 can use APIs provided by the cloud platform 204 to verify that the login information matches information stored by an identity provider 214.

The integration application 212 can invoke integration services provided by the cloud platform 204 to connect to the first cloud system 208 and the second cloud system 212. The integration services can include connector components that are each configured to connect to a certain type of cloud system. For example, a HTTP (HyperText Transport Protocol)/OData connector 216 can be configured to connect to the first cloud system 208 and a third party connector 218 that is specific to the second cloud system 212 can be configured to connect to the second cloud system 212. A connector component can be referred to as an integration adapter. Other types of connectors are possible, such as OData (Open Data), SOAP (Simple Object Access Protocol), others. New types of connectors can be supported.

Each connector component can require a token to access a respective cloud system. The cloud platform 204 can provide a token service that is configured to accept a request from a given connector component for a token, retrieve user information from the identity provider 214, and request a token from a token service provider associated with the cloud system that is associated with the given connector component. The token received from the token service provider can be provided by the token service to the connector component. The connector component can include the token in a request sent to a respective cloud system. For example, the HTTP/OData connector 216 can include a token, received from the token service and associated with the first cloud system 208, in a message 220 sent to the first cloud system 208. As another example, the third party connector 218 can include a token, received from the token service and associated with the second cloud system 212, in a message 222 sent to the second cloud system 212.

The first cloud system 208 can receive the message 220, and based on the message 220 including a token associated with the first cloud system 208, enable the message 220 to be received and processed by the application 206. Similarly, the second cloud system 212 can receive the message 222, and based on the message 222 including a token associated with the second cloud system 212, enable the message 222 to be received and processed by the application 210. The applications 206 and 210 can generate respective responses, to be returned to the HTTP/OData connector 216 or the third party connector 218, respectively, with each respective connector providing its received respective response to the integration application 202.

Figure 3:
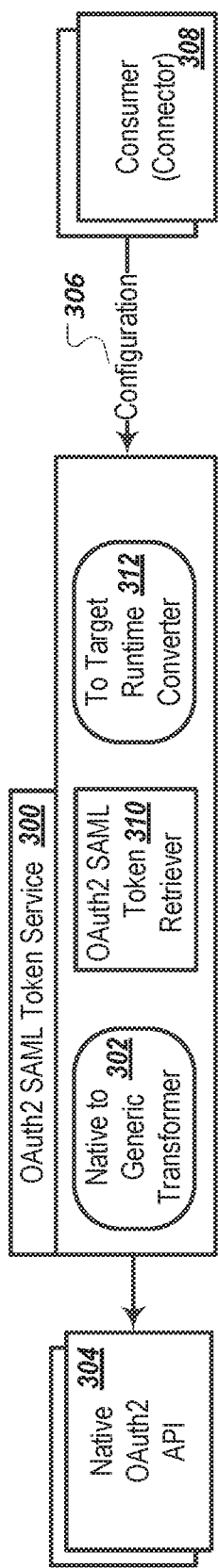
FIG. 3 is a block diagram illustrating an example of an OAuth2 SAML token service.

FIG. 3 is a block diagram illustrating an example of a token service 300. The token service 300 can be an OAuth2 SAML token service, for example. The token service 300 includes a native to generic transformer 302 that is configured to request user information using native APIs 304. The native APIs 304 can be OAuth2 APIs, for example. The request for user information can include configuration information 306 received from a consumer 308 of the token service 300. The consumer 308 can be a connector or integration adapter component. The configuration information 306 can include a token service URL of a target system to which the consumer wants to connect, a client identifier, or other information.

The native to generic transformer 302 can transform the user information received from the native APIs 304 into a token request to be sent to a token service provider by a token retriever 310. The token retriever 310 can be an OAuth2 SAML token retriever, for example. The token retriever 310 can receive a token from the token service provider. In some implementations and for some types of tokens, a target runtime converter 312 can perform transformation of the received token to a format used by the consumer 308. A consumer-specific format can be a format that is configured for a consumer-specific runtime (e.g., a particular type of archive file). The target runtime converter 312 can provide the transformed token to the consumer 308, so that the consumer 308 can use the provided token to connect with the target system.

Figure 4:
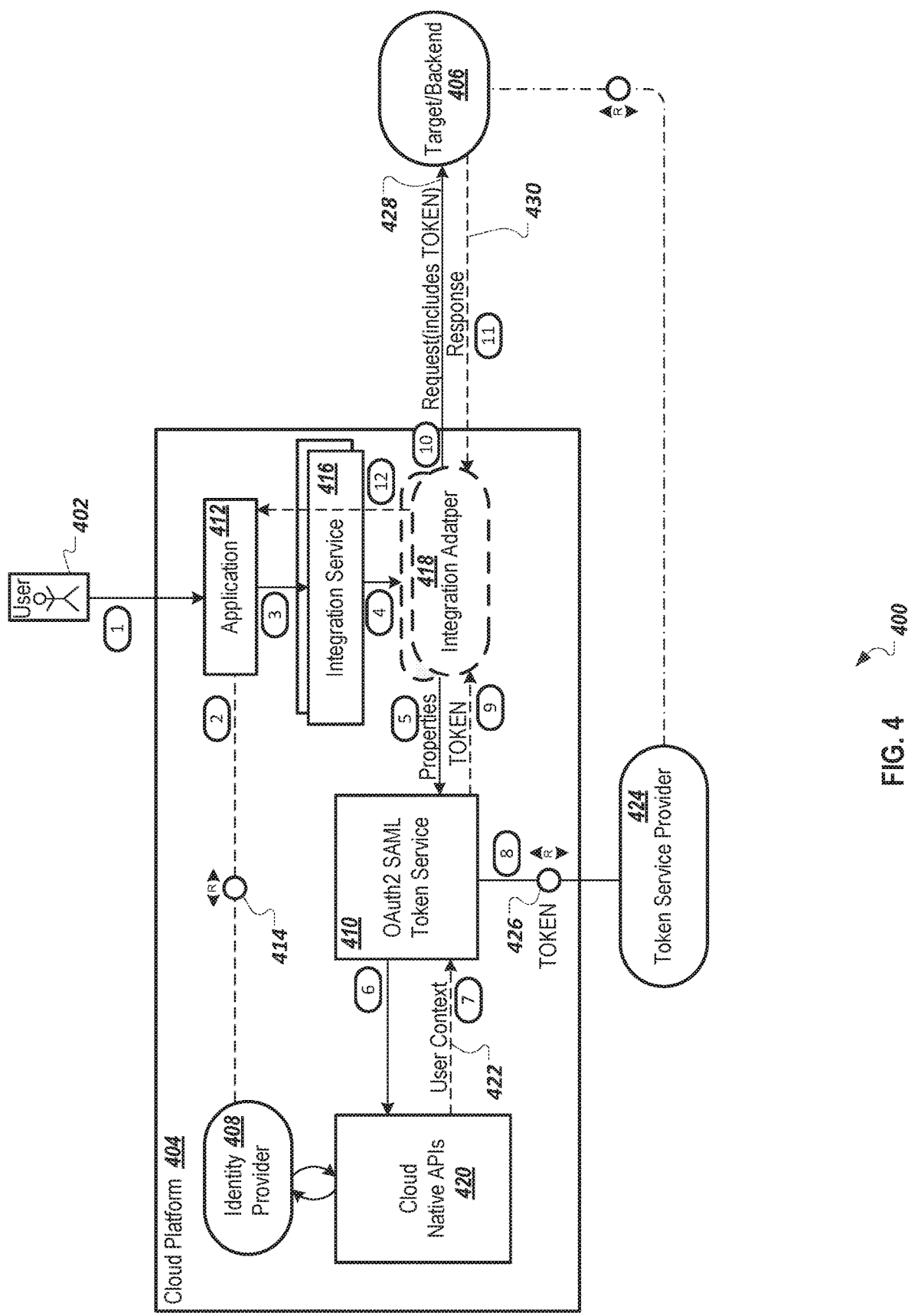
FIG. 4 illustrates a system in which an OAuth2 SAML token service provides a token for a first cloud system to access a second cloud system.

FIG. 4 illustrates a system 400 in which an OAuth2 SAML token service provides a token for a first cloud system to access a second cloud system. Initial state for the system 400 in the example of FIG. 4 can be as follows: (1) a user 402 has registered (e.g., created an account) with a cloud platform 404; (2) a trusted relationship has been established between a target system 406 and an identity provider 408 included in (or otherwise associated with) the cloud platform 404; and (3) an OAuth2 SAML token service 410 has been deployed in the cloud platform 404.

In a first stage of an integration scenario (e.g., shown as a circled "1"), the user 402 requests access to an application 412 provided by the cloud platform 404. The application 412 can be configured to use or invoke one or more services of the target system 406 (and possibly one or more services of one or more other target systems (not shown)).

In a second stage, in response to the request to access the application 412 by the user 402, the application 412 sends an authentication request 414 to the identity provider 408. The identity provider 408 attempts to authenticate the user 402 and sends an authentication response to the application 412 in response to the authentication request 414.

In a third stage, if the authentication response indicates a successful authentication of the user 402, the application 412 invokes an integration service 416, to request communication with the target system 406.

In a fourth stage, the integration service 416 identifies and invokes an integration adapter 418 that is configured to connect to the target system 406. The integration adapter 418 can require authentication to the target system 406.

In a fifth stage, the integration adapter 418 sends a request to the OAuth2 SAML token service 410 that includes properties that can include a token service URL of the target system 406 and an OAuth2 client identifier. The token service URL of the target system 406 can be a URL of a service provided by the target system 406 that generates OAuth2 tokens. For example, if the target system 406 is a Success Factors system, the token service URL may be https://example-data-center.successfactors.com/oauth/token. The OAuth2 client identifier can be an identifier that has been registered by the integration service 416.

In a sixth stage, the OAuth2 SAML token service 410 invokes native API(s) 420 of the cloud platform 404 to request user data for the user 402, such as encoded SAML content. User data can include user context or other user information stored by the identity provider 408. User data can include parameters such as a user's first and last names, a login or user name for the cloud platform 404, or an email address for the user 402.

In a seventh stage, the cloud platform 404 provides the requested user data 422 as one or more return or output values of the native API(s) 420.

In an eighth stage, the OAuth2 SAML token service 410 uses the received user context information and user data 422 to generate and send a request for an OAuth2 token to a token service provider 424. The request for the OAuth2 token can include the OAuth2 client identifier that the OAuth2 SAML token service 410 received from the integration adapter 418. The token service provider 424 can determine whether the OAuth2 client identifier has been registered with the token service provider 424. If the OAuth2 client identifier has been registered with the token service provider 424, the token service provider 424 can generate and provide an OAuth2 token 426 to the OAuth2 SAML token service 410.

In a ninth stage, the OAuth2 SAML token service 410 provides the OAuth2 token 426 to the integration adapter 418.

In a tenth stage, the integration adapter 418 creates a request 428 (e.g., a HTTP request) that includes the OAuth2 token 426 and an endpoint of a service in the target system 406 that is being invoked by the application 412. The integration adapter 418 sends the request 428 to the target system 406. The target system 406 executes the requested service.

In an eleventh stage, the target system 406 sends a response 430 to the integration adapter 418.

In a twelfth stage, the response 430 is provided to the application 412, by the integration service 416.

In some implementations, the OAuth2 SAM token service 410 caches the OAuth2 token 426 within the cloud platform 404 for use for other call(s) to the target system 406 that may occur before an expiration time of the token 426. The stored token can be used rather than requesting another token from the token service provider 424. If the OAuth2 SAML token service 410 needs a token for requested access to the target system 406 after a stored token has expired, the OAuth2 SAML token service 410 can request a new token from the token service provider 424.

Figure 5:
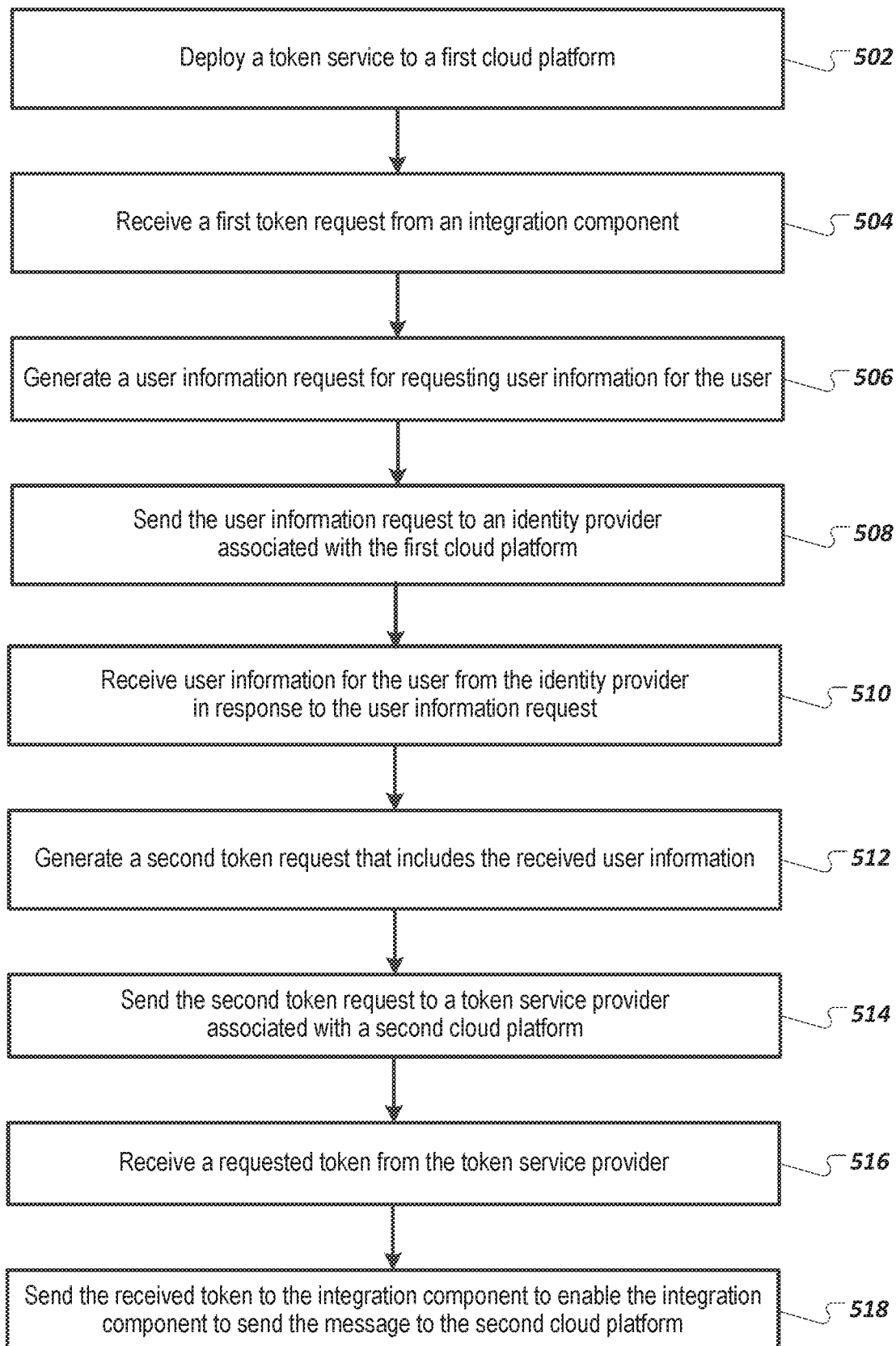
FIG. 5 is a flowchart of an example method for principal propagation.

FIG. 5 is a flowchart of an example method 500 for principal propagation. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the token service 128 of FIG. 1.

At 502, a token service is deployed to a first cloud platform. The token service can be an OAuth2 SAML token service, for example.

At 504, a first token request is received, at the token service, from an integration component, for a token to be included in a message sent by the integration component to a second cloud platform on behalf of a user application associated with a user. The first token request can include a URL of the token service provider and/or a client id associated with the token service provider. The first token request can be received by a token request interface provided by the token service.

At 506, in response to receiving the first token request, a user information request is generated for requesting user information for the user.

At 508, the user information request is sent to an identity provider associated with the first cloud platform. The user information request can be sent using a first set of native APIs specific to the first cloud platform.

At 510, user information for the user is received from the identity provider in response to the user information request.

At 512, a second token request that includes the received user information is generated. The second token request can include the URL of the token service provider that was received in the first token request.

At 514, the second token request is sent to a token service provider associated with the second cloud platform.

At 516, a requested token is received from the token service provider. The requested token can be a token generated by the token service provider in response to the second token request.

At 518, the received token is sent to the integration component to enable the integration component to send the message to the second cloud platform. The integration component can send the message, including the token, to the second cloud platform. The second cloud platform can authenticate the user at the second cloud platform and process the message.

Although integration scenarios between cloud platforms are described, in some implementations, the token service can be used within a same cloud platform, such as if principal propagation is desired to occur between two applications running on a same cloud platform. A token requester can be an integration component in this case, or can be another component who requests a token to be passed to an invoked application, to propagate credentials used when a calling application was initiated.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   deploying a token service to a first cloud platform, wherein the token service is an OAuth2 SAML token service;
   receiving, at the token service, a first token request from an integration component for a first token to be included in a message sent by the integration component to a second cloud platform on behalf of a user application associated with a user, wherein the first token request includes a URL (Uniform Resource Locator) of a token service provider associated with the second cloud platform; and
   in response to receiving the first token request:
      generating a user information request to be sent to an identity provider associated with the first cloud platform;
      sending the user information request to the identity provider, wherein the user information request is sent using a first set of native APIs (Application Programming Interfaces) specific to the first cloud platform;
      receiving user information for the user from the identity provider in response to the user information request;
      generating a second token request to be sent to the token service provider, the second token request including the received user information, wherein generating the second token request includes including the URL of the token service provider in the second token request;
      sending the second token request to the token service provider;
      receiving a requested token from the token service provider; and
      sending the received token to the integration component to enable the integration component to send the message to the second cloud platform.

2. The method of claim 1, wherein the first token request is made using a token request interface provided by the token service.

3. A system comprising:
   one or more computers; and
   a computer-readable medium coupled to the one or more computers having instructions stored thereon which, when executed by the one or more computers, cause the one or more computers to perform operations comprising:
      deploying a token service to a first cloud platform, wherein the token service is an OAuth2 SAML token service;
      receiving, at the token service, a first token request from an integration component for a first token to be included in a message sent by the integration component to a second cloud platform on behalf of a user application associated with a user, wherein the first token request includes a URL (Uniform Resource Locator) of a token service provider associated with the second cloud platform; and in response to receiving the first token request:
   generating a user information request to be sent to an identity provider associated with the first cloud platform;
   sending the user information request to the identity provider;
   receiving user information for the user from the identity provider in response to the user information request;
   generating a second token request to be sent to the token service provider, the second token request including the received user information, wherein the user information request is sent using a first set of native APIs (Application Programming Interfaces) specific to the first cloud platform;
   sending the second token request to the token service provider;
   receiving a requested token from the token service provider; and
   sending the received token to the integration component to enable the integration component to send the message to the second cloud platform.

4. The system of claim 3, wherein the first token request is made using a token request interface provided by the token service.

5. A computer program product encoded on a non-transitory storage medium, the product comprising non-transitory, computer readable instructions for causing one or more processors to perform operations comprising:

deploying a token service to a first cloud platform, wherein the token service is an OAuth2 SAML token service;

receiving, at the token service, a first token request from an integration component for a first token to be included in a message sent by the integration component to a second cloud platform on behalf of a user application associated with a user, wherein the first token request includes a URL (Uniform Resource Locator) of a token service provider associated with the second cloud platform; and in response to receiving the first token request:
   generating a user information request to be sent to an identity provider associated with the first cloud platform;
   sending the user information request to the identity provider;
   receiving user information for the user from the identity provider in response to the user information request;
   generating a second token request to be sent to the token service provider, the second token request including the received user information, wherein the user information request is sent using a first set of native APIs (Application Programming Interfaces) specific to the first cloud platform;
   sending the second token request to the token service provider;
   receiving a requested token from the token service provider; and
   sending the received token to the integration component to enable the integration component to send the message to the second cloud platform.

6. The computer program product of claim 5, wherein the first token request is made using a token request interface provided by the token service.

* * * * *